(12) United States Patent
Kelley (10) Patent No.: US 9,438,824 B2
(45) Date of Patent: Sep. 6, 2016

(54) VIDEO RECORDING ASSEMBLY (71) Applicant: Darren R. Kelley, Triangle, VA (US)

(72) Inventor: Darren R. Kelley, Triangle, VA (US)

( * ) Notice: Subject to any disclaimer, the term of this patent is extended or adjusted under 35 U.S.C. 154(b) by 0 days.

(21) Appl. No.: 14/488,897

(22) Filed: Sep. 17, 2014

(65) Prior Publication Data
US 2016/0080663 A1    Mar. 17, 2016

(51) Int. Cl.
| | |
|---|---|
| *H04N 5/28* | (2006.01) |
| *B25J 5/02* | (2006.01) |
| *B25J 13/08* | (2006.01) |
| *B61C 3/00* | (2006.01) |
| *B61L 3/00* | (2006.01) |
| *H04N 5/77* | (2006.01) |

(52) U.S. Cl.
CPC . *H04N 5/28* (2013.01); *B25J 5/02* (2013.01); *B25J 13/08* (2013.01); *B61C 3/00* (2013.01); *B61L 3/002* (2013.01); *H04N 5/77* (2013.01); *Y10S 901/01* (2013.01); *Y10S 901/47* (2013.01)

(58) Field of Classification Search
CPC ............. H04N 5/28; H04N 5/77; B25J 5/02; B25J 13/08; B61C 3/00; B61C 3/002; Y10S 901/01; Y10S 901/47
USPC ......... 352/131, 243; 396/153, 419; 104/118, 104/119
See application file for complete search history.

(56) References Cited

U.S. PATENT DOCUMENTS

| | | | |
|---|---|---|---|
| 4,944,228 A * | 7/1990 | Rhodes | B61B 10/04 104/172.2 |
| 5,938,564 A | 8/1999 | Bachman | |
| 7,572,205 B1 | 8/2009 | Cribar | |
| 7,625,314 B2 | 12/2009 | Ungari et al. | |
| 7,818,090 B2 * | 10/2010 | Okamoto | G05D 1/0272 700/253 |
| D630,268 S | 1/2011 | Cunningham | |
| 2003/0151554 A1 | 8/2003 | McCarthy | |
| 2005/0231689 A1 * | 10/2005 | Longley | F16M 11/42 352/243 |
| 2015/0012168 A1 * | 1/2015 | Kuklish | G05D 1/02 701/23 |

* cited by examiner

*Primary Examiner* — Aaron L Troost (57) ABSTRACT

A video recording assembly includes a cart that may be positioned on a support surface. A plurality of wheels is coupled to the cart. A track may be positioned on the support surface so the track extends between a starting point and an end point. A processor is coupled to the cart. A motor is coupled to the cart, the processor and the wheels. The motor may urge the cart along the support surface. A camera is coupled to the cart and the processor. The camera may record the athlete while the athlete is running. A sensor is coupled to the cart and the processor. The sensor may detect a motion of the athlete. A plurality of pins is coupled to the cart. The pins engage the track. The cart is guided between the starting and end points. The cart travels alongside the athlete when the athlete is running.

11 Claims, 7 Drawing Sheets

VIDEO RECORDING ASSEMBLY

BACKGROUND OF THE DISCLOSURE

Field of the Disclosure

The disclosure relates to recording devices and more particularly pertains to a new recording device for recording an athlete while the athlete is running.

SUMMARY OF THE DISCLOSURE

An embodiment of the disclosure meets the needs presented above by generally comprising a cart that may be positioned on a support surface proximate an athlete participating in a foot race. A plurality of wheels is coupled to the cart. The wheels may roll along the support surface. A track may be positioned on the support surface so the track extends between a starting point and an end point. A processor is coupled to the cart. A motor is coupled to the cart. The motor is electrically coupled to the processor. The motor is operationally coupled to the wheels on the cart. The motor may urge the cart along the support surface. A camera is coupled to the cart. The camera may record the athlete while the athlete is running. The camera is electrically coupled to the processor. A sensor is coupled to the cart. The sensor may detect a motion of the athlete. The sensor is electrically coupled to the processor. The sensor actuates the motor when the sensor detects motion of the athlete. A plurality of pins is coupled to the cart. The pins engage the track. The cart is guided between the starting and end points when the motor urges the cart along the support surface. The cart may travel along side the athlete when the athlete is running.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
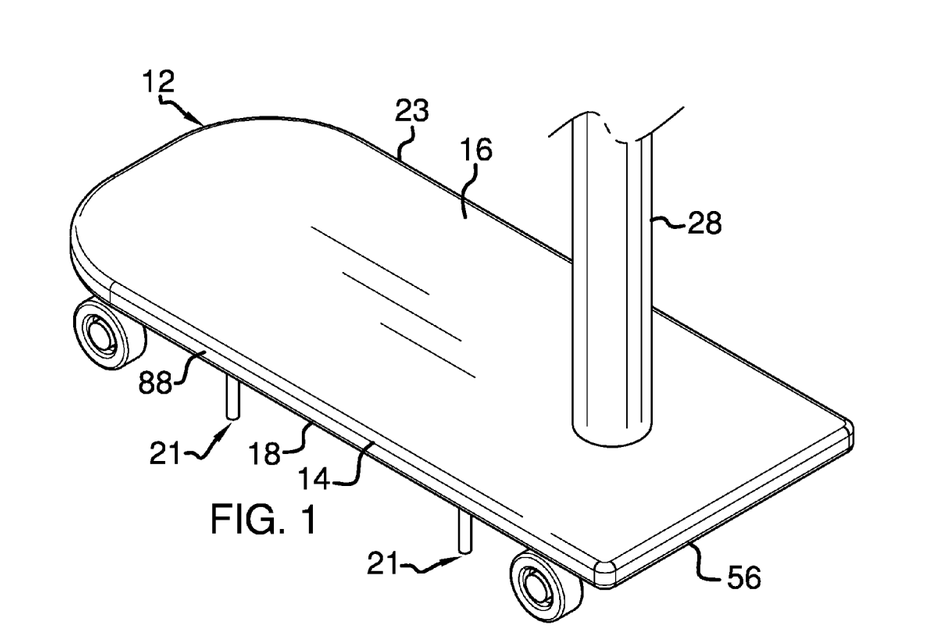
FIG. 1 is a top perspective view of a video recording assembly according to an embodiment of the disclosure.
Figure 2:
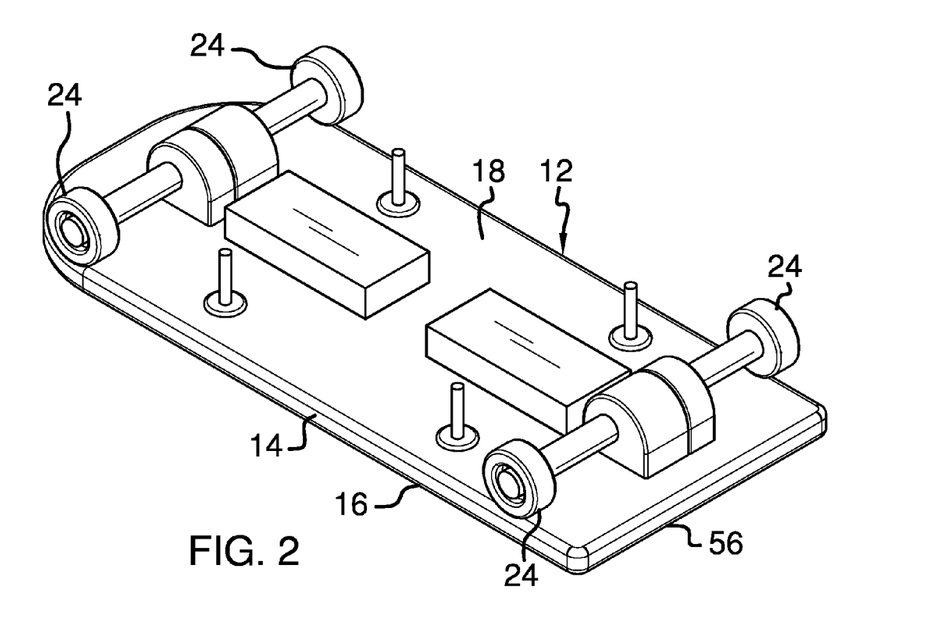
FIG. 2 is a bottom perspective view of an embodiment of the disclosure.
Figure 3:
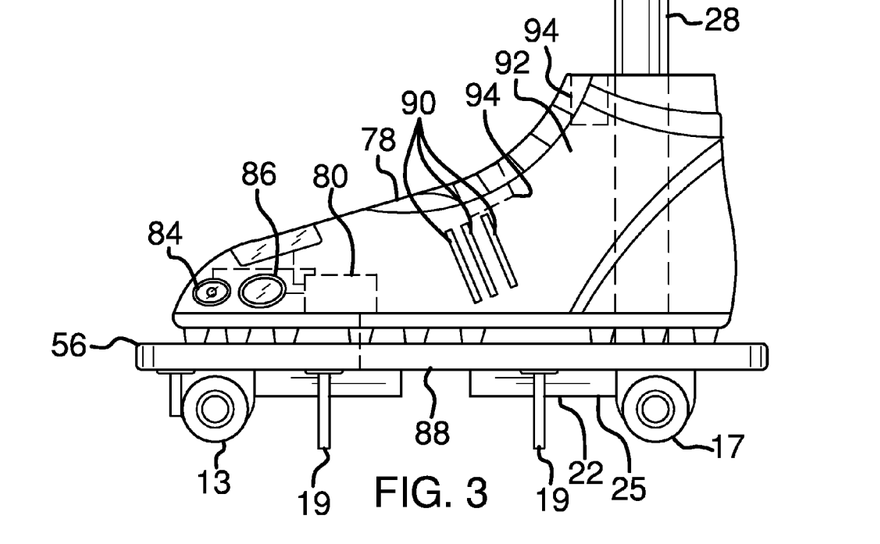
FIG. 3 is a left side view of an embodiment of the disclosure.
Figure 4:
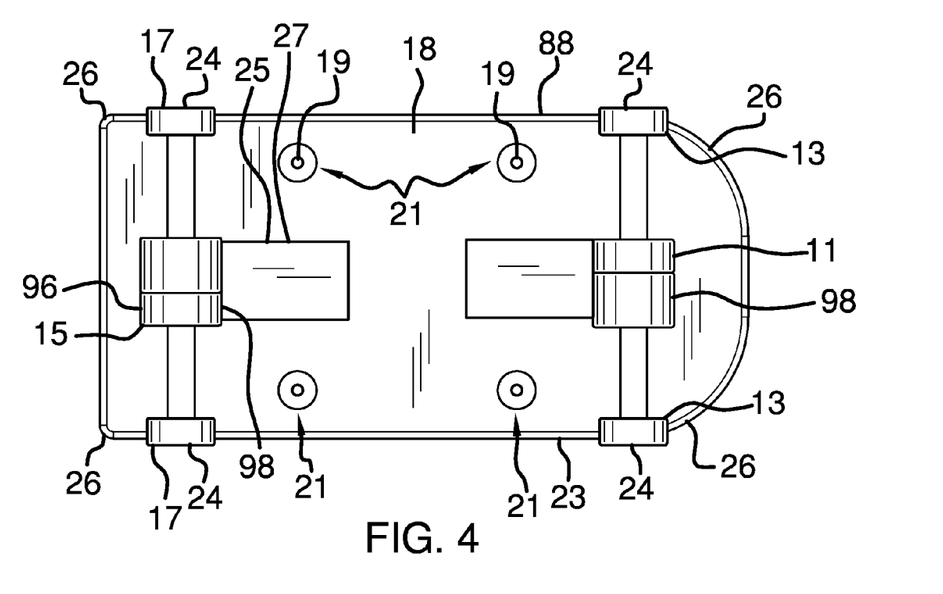
FIG. 4 is a bottom view of an embodiment of the disclosure.
Figure 5:
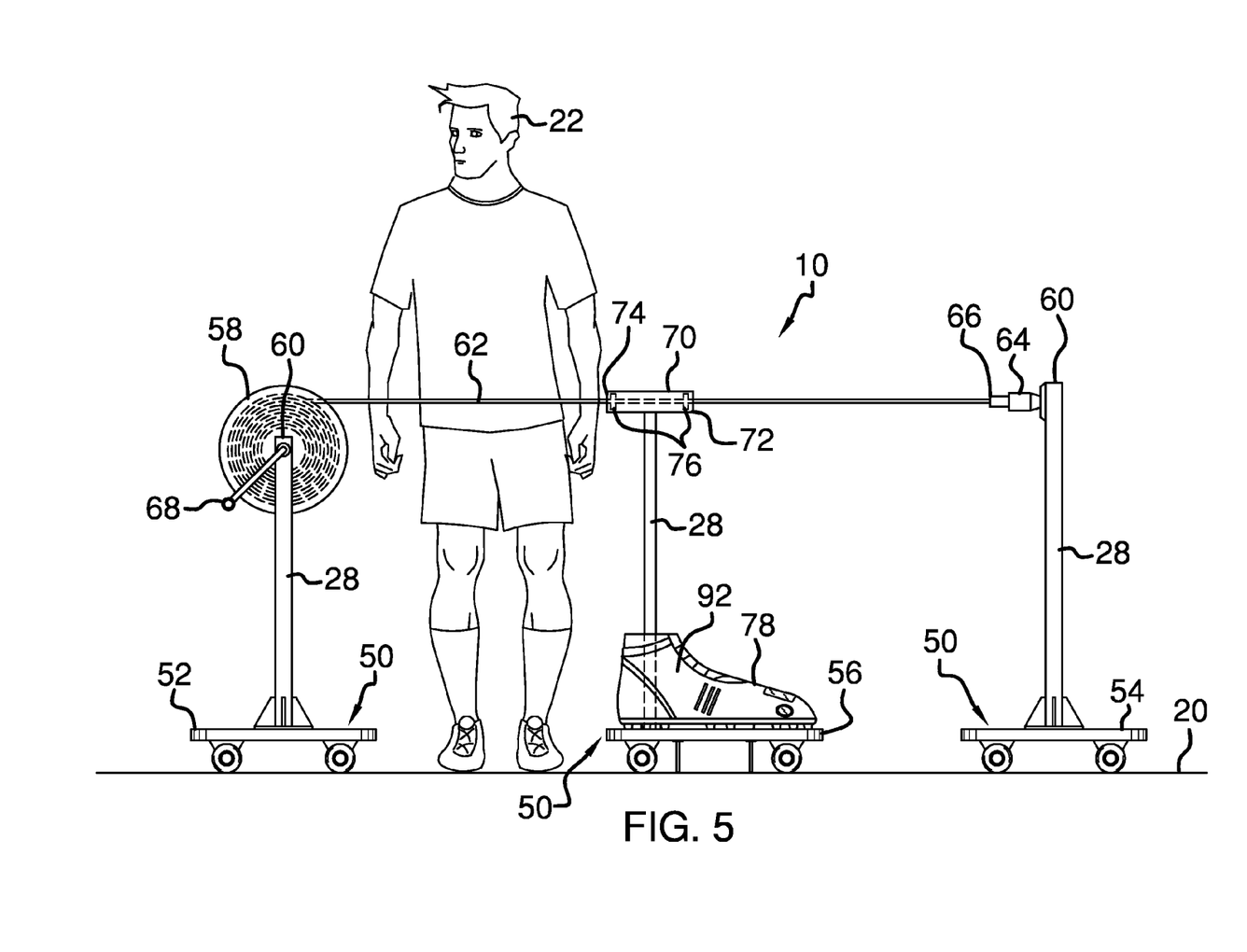
FIG. 5 is an in-use view of an embodiment of the disclosure.
Figure 6:
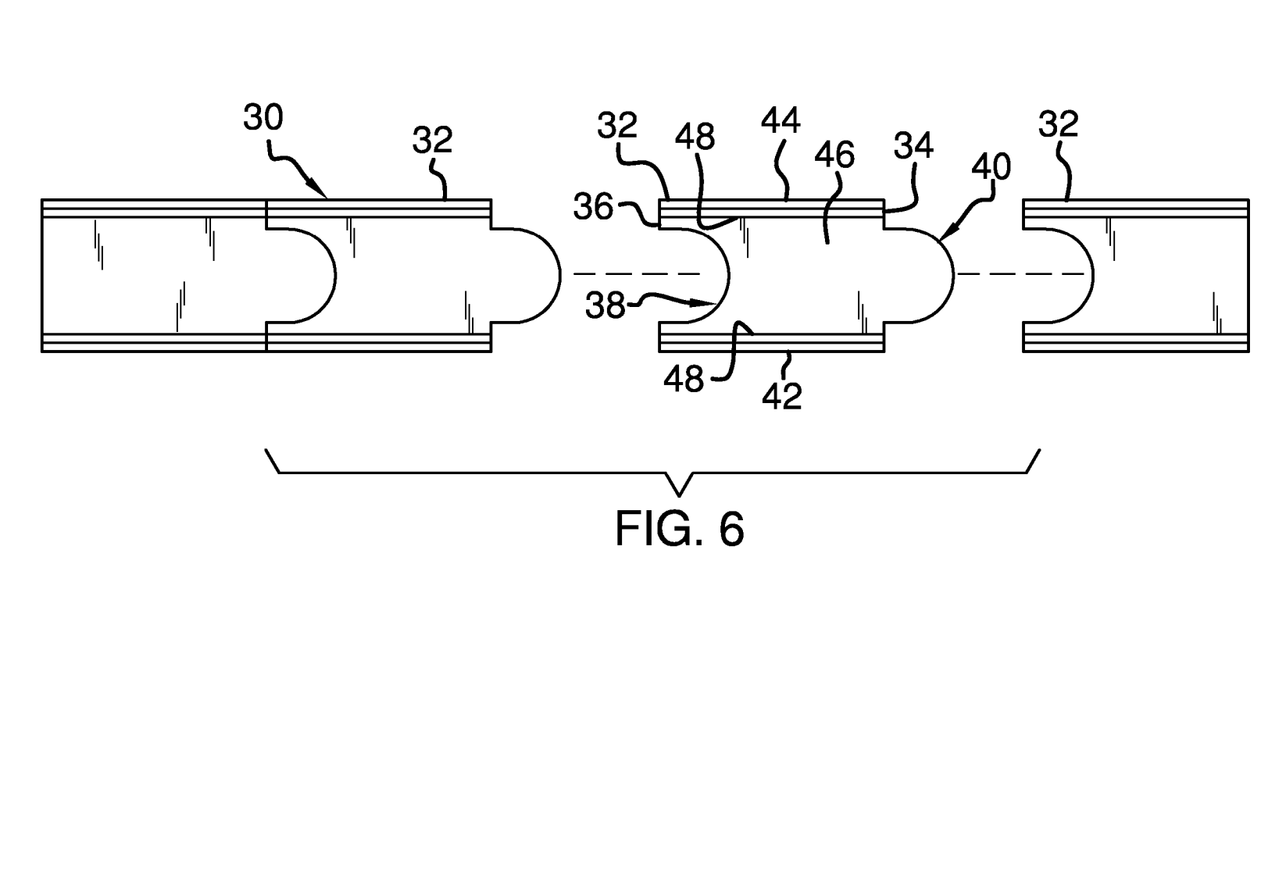
FIG. 6 is a top view of a track of an embodiment of the disclosure.
Figure 7:
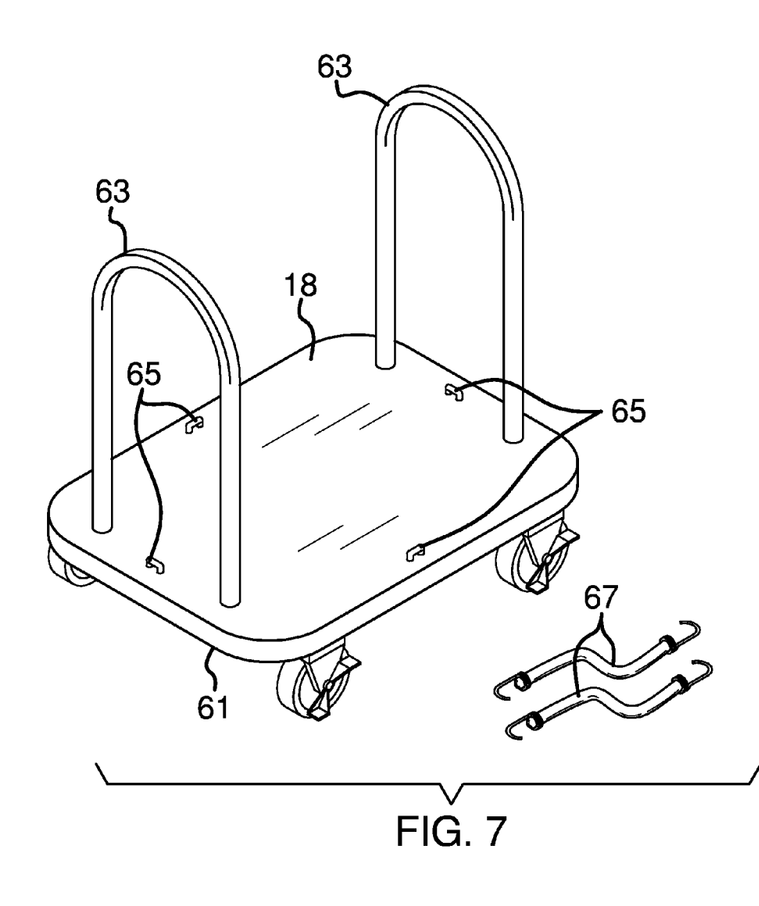
FIG. 7 is a perspective view of an embodiment of the disclosure.
Figure 8:
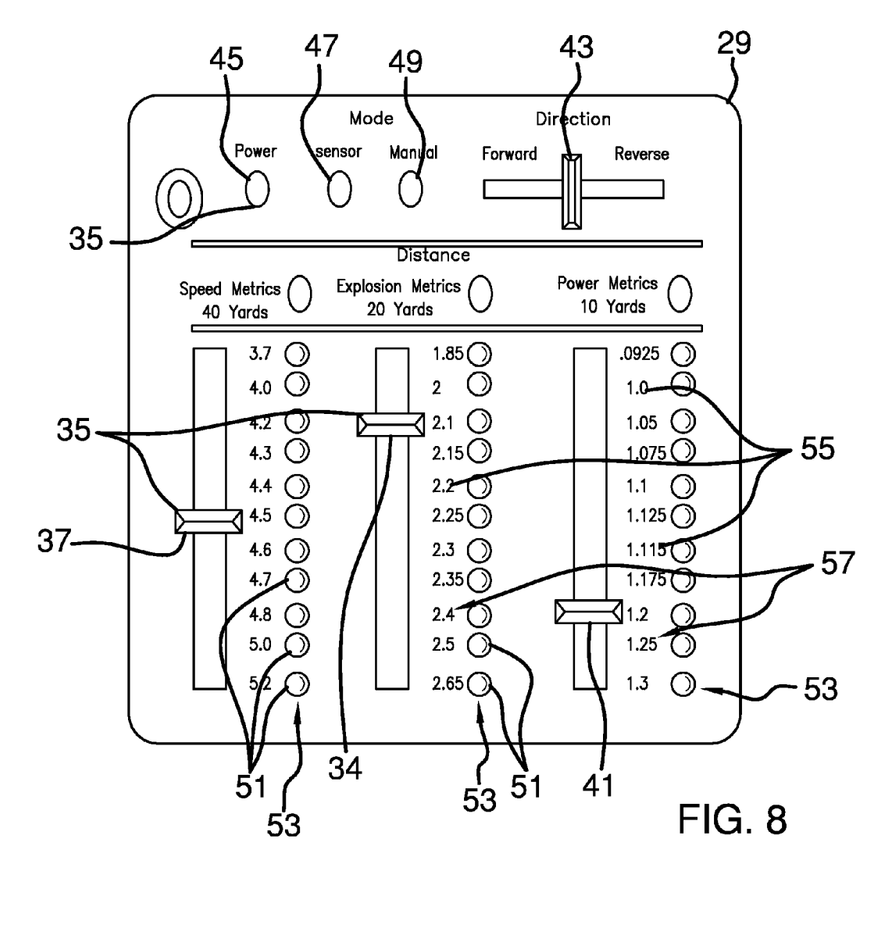
FIG. 8 is a top view of remote control of an embodiment of the disclosure.
Figure 9:
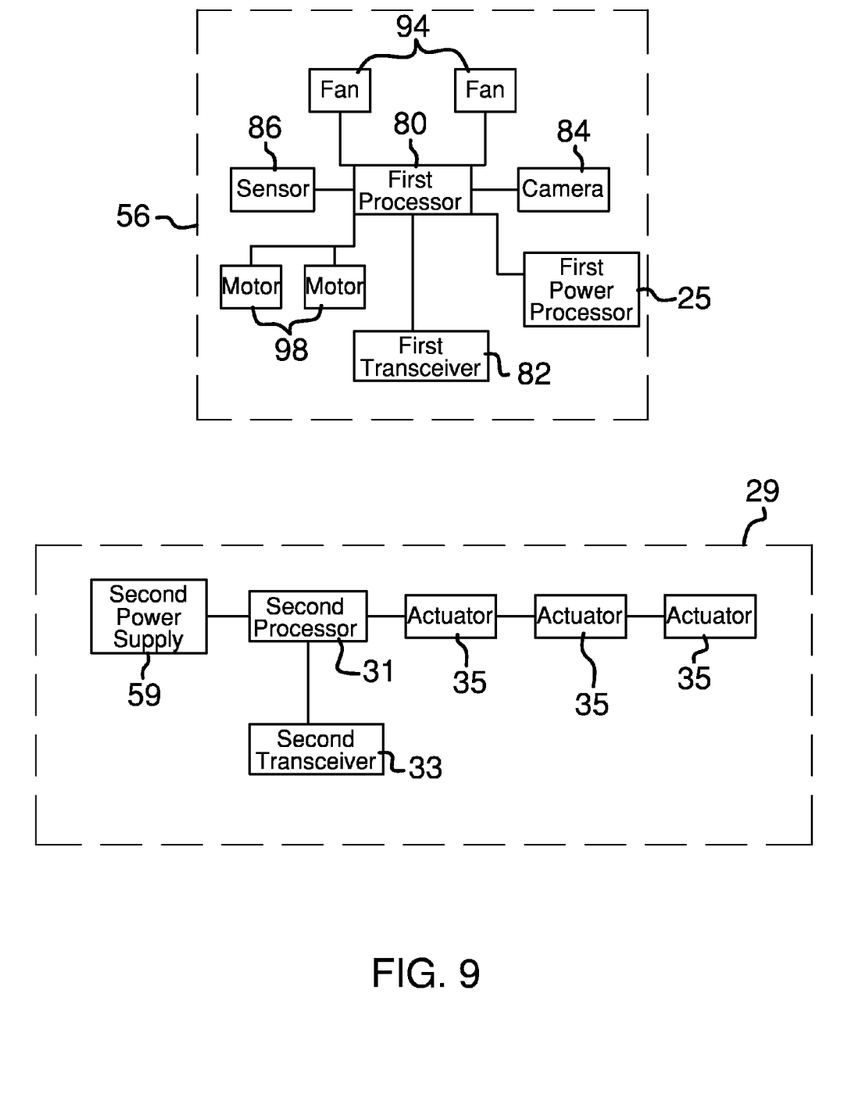
FIG. 9 is a schematic view of an embodiment of the disclosure.

With reference now to the drawings, and in particular to FIGS. 1 through 9 thereof, a new recording device embodying the principles and concepts of an embodiment of the disclosure and generally designated by the reference numeral 10 will be described.

As best illustrated in FIGS. 1 through 9, the video recording assembly 10 generally comprises a cart 12 that has an exterior edge 14 extending between each of a top side 16 and a bottom side 18 of the cart 12. The cart 12 may be positioned on a support surface 20 proximate an athlete 22 participating in a foot race. The support surface 20 may be ground. The athlete 22 may be any individual with a desire to participate in running.

A plurality of wheels 24 is rotatably coupled to the bottom side 18 of the cart 12. The wheels 24 may roll along the support surface 20. The plurality of wheels 24 is positioned proximate an associated one of four corners 26 of the cart 12. A tower 28 is coupled to and extends upwardly from the top side 16 of the cart 12.

A track 30 is provided. The track 30 may be positioned on the support surface 20 so the track 30 extends between a starting point and an end point. Moreover, the track 30 may be positioned so the track 30 is coextensive with the route the athlete 22 will run. The track 30 comprises a plurality of segments 32 of the track 30.

Each of the segments 32 has a front end 34 and a back end 36. The back end 36 of each of the segments 32 each has a groove 38 extending forwardly therein. The front end 34 of the segments 32 each has a lobe 40 extending forwardly therefrom. The grooves 38 on the segments 32 insertably receive the lobe 40 on an adjacent one of the segments 32 so the segments 32 are coupled together.

The segments 32 each has a first lateral edge 42 and a second lateral edge 44 extending between the front 34 and back ends 36 of the segments 32. A top side 46 of the segments 32 has a pair of rails 48 extending upwardly therefrom. The rails 48 each extend between the front 34 and back 36 ends of the segments 32. The rails 48 are each positioned adjacent to an associated one of the first 42 and second 44 lateral edges of the segments 32.

The cart 12 is one of a plurality of the carts 50. Each of a first one 52 and a third one 54 of the carts 50 may be positioned at an associated one of the starting and end points. A second one 56 of the carts 50 is positionable between the first 52 and third 54 carts. The first 52, second 56 and third 54 carts are aligned with the route the athlete 22 will run.

A spindle 58 is rotatably coupled to a top end 60 of the tower 28 on the first cart 52. The spindle 58 contains a cable 62. The cable 62 is selectively extendable between the tower 28 on the first cart 52 and the top end 60 of the tower 28 on the third cart 54. A coupler 64 is coupled to a free end 66 of the cable 62. The coupler 64 engages the top end 60 of the tower 28 on the third cart 54. The coupler 64 retains the cable 62 between the first 52 and third 54 carts. A handle 68 is coupled to the spindle 58. The handle 68 may be rotated to retract the cable 62 onto the spindle 58.

A chute 70 is coupled to the top end 60 of the tower 28 on the second cart 56. The chute 70 is elongated between each a front end 72 and a back end 74 of the chute 70. The front 72 and back 74 ends of the chute 70 are open. The chute 70 is substantially hollow.

A pair of bearing 76 is coupled to the chute 70. Each of the bearings 76 is positioned within an associated one of the front 72 and back 74 ends of the chute 70. The cable 62 is extendable through the bearings 76 in the chute 70 so the second cart 56 is movably coupled to the cable 62. The bearings 76 may be friction reducing bearings of any conventional design.

A cover 78 is removably coupled to the top side 16 of the second cart 56. The cover 78 is shaped to resemble an athletic shoe. A first processor 80 is coupled to the cover 78. The first processor 80 may be an electronic processor of any conventional design.

A first transceiver 82 is coupled to the cover 78. The first transceiver 82 is electrically coupled to the first processor 80. The first transceiver 82 may be an RF transceiver of any conventional design. A camera 84 is coupled to the cover 78. The camera 84 may record the athlete 22 while the athlete 22 is running. The camera 84 is electrically coupled to the first processor 80. The camera 84 may be a digital camera of any conventional design.

A sensor 86 is coupled to the cover 78. The sensor 86 is positioned proximate a first oblique side 88 of the second cart 56 when the cover 78 is coupled to the second cart 56. The sensor 86 may detect a motion of the athlete 22. The sensor 86 is electrically coupled to the first processor 80. Additionally, the sensor 86 may be a motion sensor of any conventional design.

A plurality of vents 90 extends through an extraneous wall 92 of the cover 78. A pair of fans 94 is coupled to the cover 78. The pair of fans 94 are electrically coupled to the first processor 80. Additionally, the pair of fans 94 urge air outwardly from the plurality of vents 90 to cool the first processor 80, first transceiver 82, the sensor 86 and the camera 84.

A motor 96 is coupled to the second cart 56. The motor 96 is electrically coupled to the first processor 80 when the cover 78 is coupled to the second cart 56. The motor 96 is operationally coupled to the wheels 24 on the second cart 56. The motor 96 may urge the second cart 56 along the support surface 20. The sensor 86 actuates the motor 96 when the sensor 86 detects motion of the athlete 22.

The motor 86 is one of a pair of motors 98. A forward one 11 of the motors 98 urges the second cart 56 between the starting point and the end point. The forward motor 11 is operationally coupled to a front set 13 of the wheels 24. A reverse one 15 of the motors 98 urges the second cart 56 between the end point and the starting point. The reverse motor 15 is operationally coupled to a back set 17 of the wheels 24.

A plurality of pins 19 is coupled to and extends downwardly from the bottom side 18 of the second cart 56. The pins 19 comprise a pair of sets 21 of the pins 19 that is each positioned adjacent to the first oblique side 88 and a second oblique side 23 of the second cart 56. The second cart 56 is positionable over the track 30 so each of the sets of pins 19 engages an associated one of the pair of rails 48 on the track 30.

The track 30 guides the second cart 56 between the starting and end points when the motors 98 urge the second cart 56 along the support surface 20. The second cart 56 may travel along side the athlete 22 when the athlete 22 is running. A first power supply 25 is coupled to the bottom side 18 of the second cart 56. The first power supply 25 is electrically coupled to the first processor 80. The first power supply 25 comprises at least one battery 27.

A remote control 29 is provided. A second processor 31 is coupled to the remote control 29. The second processor 31 may be an electronic processor of any conventional design. A second transceiver 33 is coupled to the remote control 29. The second transceiver 33 is electrically coupled to the second processor 31. The second transceiver 33 is in electromagnetic communication with the first transceiver 82.

A plurality of actuators 35 is coupled to the remote control 29. The plurality of actuators 35 is each electrically coupled to the second processor 31. A forty yard 37, a twenty yard 39 and a ten yard 41 one of the plurality of actuators 35 is slidably coupled to the remote control 29. The forty 37, twenty 39 and ten 41 yard actuators are set to determine a speed of the second cart 26 with respect to the athlete 22. Each of the forty 37, twenty 39 and ten 41 yard actuators are set to match the speed of the athlete 22. A direction one 43 of the actuators 35 actuates an associated one of the forward 11 and reverse 15 motors.

The plurality of actuators 35 further comprises a power one 45, a sensor one 47 and a manual one 49 of the actuators 35. The power actuator 45 actuates the remote control 29. The sensor actuator 47 allows the motors 98 to be actuated when the sensor 86 detects the motion of the athlete 22. The manual actuator 49 allows the motors 98 to be manually actuated.

A plurality of light emitter 51 is coupled to the remote control 29. The plurality of light emitters 51 is electrically coupled to the second processor 31. The plurality of light emitters 51 comprise a plurality of sets 53 of the light emitters 51. Each of the plurality of sets of light emitters 53 is arranged to be coextensive with an associated one of the ten 41, twenty 39 and forty 37 yard actuators. Indicia 55 is printed on the remote control 29. The indicia 55 comprise a plurality of numbers 57. The numbers 57 indicate a range of speed relating to each of the ten 41, twenty 39 and forty 37 yard actuators.

A second power supply 59 is coupled to the remote control 29. The second power supply 59 is electrically coupled to the second processor 31. The second power supply 59 comprises at least one battery 27.

A transport one 61 of the carts 50 has a pair of loops 63 coupled to and extending upwardly from the top side 18 of the transport cart 61. Each of the loops 63 are positioned on opposite ends of the transport cart 61. The loops 63 may be gripped to push the transport cart 61 along the support surface 20.

A plurality of hooks 65 is coupled to the top side 18 of the transport cart 61. Each of the hooks 65 is positioned proximate an associated one of four sides of the transport cart 61. The first 52, second 56 and third 54 carts are positionable on the top side 18 of the transport cart 61. A plurality of straps 67 is provided. The plurality of straps 67 are removably coupled to selected ones of the plurality of hooks 65 to secure the first 52, second 56 and third 54 carts on the transport cart 61.

In use, the first 52, second 56 and third 54 carts and the track are arranged on the support surface 20. The remote control 29 is used to determine the distance the athlete will run and to determine if the motors 98 are to be actuated manually or by the sensor 86. The assembly 10 is utilized to record the athlete 22 while the athlete 22 runs. The athlete 22 may view the recorded footage to analyze the athlete's 22 performance.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A video recording assembly comprising:
   a track configured to be positioned on a support surface such that said track extends between a starting point and an end point;
   a cart configured to be positioned on the support surface proximate an athlete participating in a foot race, said cart having a plurality of wheels coupled to said cart such that said wheels are configured to roll along the support surface, said cart being a second cart of a plurality of carts and positioned between a first cart configured to be positioned at the starting point and a third cart configured to be positioned at the end point;
   a processor coupled to said second cart;
   a motor coupled to said second cart, said motor being electrically coupled to said
   processor, said motor being operationally coupled to said wheels on said second cart such that said motor is configured to urge said second cart along the support surface;
   a camera coupled to said second cart wherein said camera is configured to record the athlete while the athlete is running, said camera being electrically coupled to said processor;
   a sensor coupled to said second cart wherein said sensor is configured to detect a motion of the athlete, said sensor being electrically coupled to said processor such that said sensor actuates said motor when said sensor detects motion of the athlete; a plurality of pins coupled to said second cart, said pins engaging said track such that said second cart is guided between said starting and end points when said motor urges said second cart along the support surface wherein said second cart is configured to travel along side the athlete when the athlete is running; and
   a spindle rotatably coupled to a top end of a tower on said first cart, said spindle containing a cable such that said cable is selectively extendable between said tower on said first cart and a top end of a tower on said third cart.

2. The assembly according to claim 1, further comprising said second cart having an exterior edge extending between each of a top side and a bottom side of said second cart.

3. The assembly according to claim 2, further comprising said plurality of wheels being rotatably coupled to said bottom side of said second cart.

4. The assembly according to claim 3, further comprising a tower coupled to and extending upwardly from said top side of said second cart.

5. The assembly according to claim 1, further comprising a power supply coupled to said second cart, said power supply being electrically coupled to said processor, said power supply comprising at least one battery.

6. A video recording assembly comprising:
   a track configured to be positioned on a support surface such that said track extends between a starting point and an end point;
   a cart configured to be positioned on the support surface proximate an athlete participating in a foot race, said cart having a plurality of wheels coupled to said cart such that said wheels are configured to roll along the support surface, said cart being a second cart of a plurality of carts and positioned between a first cart configured to be positioned at the starting point and a third cart configured to be positioned at the end point;
   a processor coupled to said second cart;
   a motor coupled to said second cart, said motor being electrically coupled to said processor, said motor being operationally coupled to said wheels on said second cart such that said motor is configured to urge said second cart along the support surface;
   a camera coupled to said second cart wherein said camera is configured to record the athlete while the athlete is running, said camera being electrically coupled to said processor;
   a sensor coupled to said second cart wherein said sensor is configured to detect a motion of the athlete, said sensor being electrically coupled to said processor such that said sensor actuates said motor when said sensor detects motion of the athlete;
   a plurality of pins coupled to said second cart, said pins engaging said track such that said second cart is guided between said starting and end points when said motor urges said second cart along the support surface wherein said second cart is configured to travel along side the athlete when the athlete is running;
   a chute coupled to a top end of a tower on the second cart, said chute being elongated between each a front end and a back end of said chute, said font and back ends of said chute being open, said chute being substantially hollow.

7. The assembly according to claim 6, further comprising a cable being extendable through said first and second ends of said chute such that said second cart is movably coupled to said cable.

8. A video recording assembly comprising:
   a track configured to be positioned on a support surface such that said track extends between a starting point and an end point;
   a cart configured to be positioned on a support surface proximate an athlete participating in a foot race, said cart having a plurality of wheels coupled to said cart such that said wheels are configured to roll along the support surface said cart configured to be one of a plurality of carts;
   a processor coupled to said cart;
   a motor coupled to said cart, said motor being electrically coupled to said
   processor, said motor being operationally coupled to said wheels on said cart such that said motor is configured to urge said cart along the support surface;
   a camera coupled to said cart wherein said camera is configured to record the
   athlete while the athlete is running, said camera being electrically coupled to said processor;

a sensor coupled to said cart wherein said sensor is configured to detect a motion of the athlete, said sensor being electrically coupled to said processor such that said sensor actuates said motor when said sensor detects motion of the athlete;

a plurality of pins coupled to said cart, said pins engaging said track such that said cart is guided between said starting and end points when said motor urges said cart along the support surface wherein said cart is configured to travel along side the athlete when the athlete is running; and said track comprising a plurality of segments of said track, each of said segments having a front end and a back end, said back end of each of said segments each having a groove extending forwardly therein, said front end of said segments each having a lobe extending forwardly therefrom, said grooves on said segments insertably receiving said lobe on an adjacent one of said segment such that said segments are coupled together.

9. The assembly according to claim 8, further comprising said segments each having a first lateral edge and a second lateral edge extending between said front and back ends of said segments, a top side of said segments having a pair of rails extending upwardly therefrom, said rails each extending between said front and back ends of said segments, said rail each being positioned adjacent to an associated one of said first and second lateral edges of said segments.

10. The assembly according to claim 9, further comprising: said pins being coupled to and extending downwardly from a bottom side of said second cart, said pins comprising a pair of sets of said pins each being positioned adjacent to a first oblique side and a second oblique side of said cart, said cart being positionable over said track such that each of said sets of pins engages an associated one of said pair of rails on said track.

11. The assembly according to claim 8, further comprising:

said cart having an exterior edge extending between each of a top side and a bottom side of said cart and a tower coupled to and extending upwardly from said top side of said cart;

said segments each having a first lateral edge and a second lateral edge extending between said front and back ends of said segments, a top side of said segments having a pair of rails extending upwardly therefrom, said rails each extending between said front and back ends of said segments, said rail each being positioned adjacent to an associated one of said first and second lateral edges of said segments;

said cart being a second cart of a plurality of carts and positioned between a first cart configured to be positioned at the starting point and a third cart configured to be positioned at the end point;

a spindle rotatably coupled to a top end of said tower on said first cart, said spindle containing a cable such that said cable is selectively extendable between said tower on said first cart and said top end of said tower on said third cart;

a chute coupled to said top end of said tower on said second cart, said chute being elongated between each a front end and a back end of said chute, said front and back ends of said chute being open, said chute being substantially hollow, said cable being extendable through said first and second ends of said chute such that said second cart is movably coupled to said cable;

said plurality of pins being coupled to and extending downwardly from said bottom side of said second cart, said pins comprising a pair of sets of said pins each being positioned adjacent to a first oblique side and a second oblique side of said second cart, said second cart being positionable over said track such that each of said sets of pins engages an associated one of said pair of rails on said track; and a power supply coupled to said second cart, said power supply being electrically coupled to said processor, said power supply comprising at least one battery.

* * * * *